US008661242B1

United States Patent
Gershman et al.

(10) Patent No.: US 8,661,242 B1
(45) Date of Patent: Feb. 25, 2014

(54) AUTONOMOUS PASSWORD UPDATE IN SNMPV3 COMPUTER NETWORK

(75) Inventors: Vladimir Gershman, Holland, PA (US); John Bellizzi, Marlton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 266 days.

(21) Appl. No.: 12/975,600

(22) Filed: Dec. 22, 2010

(51) Int. Cl.
*H04L 29/06* (2006.01)
*G06F 21/00* (2013.01)

(52) U.S. Cl.
USPC .............................. 713/153; 709/223; 726/4

(58) Field of Classification Search
None
See application file for complete search history.

(56) References Cited

U.S. PATENT DOCUMENTS

2005/0015604 A1* 1/2005 Sundararajan et al. ....... 713/184
2007/0162973 A1* 7/2007 Schneier et al. ................ 726/22
2007/0174901 A1* 7/2007 Chang et al. ....................... 726/5
2007/0239621 A1* 10/2007 Stukanov ......................... 705/72

* cited by examiner

*Primary Examiner* — Gilberto Barron, Jr.
*Assistant Examiner* — Malcolm Cribbs
(74) *Attorney, Agent, or Firm* — Howard IP Law Group, PC

(57) ABSTRACT

A network running SNMPv3 includes conventional managed devices and a control provided with timed updating of the authentication and privacy password set. The timed updating function maintains memorized current and new password sets for each managed device. From time to time, a new set of passwords is automatically generated. A "change password" message including the new passwords is sent to the managed devices encoded with the current passwords. If the current passwords are authenticated by the managed device(s), the new passwords are adopted by the managed devices as current passwords, and an acknowledgement is sent to the control encoded with the new passwords. The control responds by updating its stored current passwords to the new passwords for each individual managed device. When a user wants information, the control encodes the request message with the current passwords, and the managed device responds with the information when the current passwords are verified.

16 Claims, 6 Drawing Sheets

AUTONOMOUS PASSWORD UPDATE IN SNMPV3 COMPUTER NETWORK

BACKGROUND

FIG. 1 is a simplified block diagram of a prior-art SNMPv3 network 10 including a Network Management System (NMS) node, device or apparatus 12 interconnected by data paths designated generally as 14 with a plurality of managed devices 16a, 16b, and 16c of a set 16 of managed devices. In FIG. 1, the various managed devices of set 16 include sensors, designated 16 as, 16bs, . . . , 16cs for measuring one or more physical parameters of equipment associated with the managed devices. Such a sensor might be, for example, a temperature-sensitive analog device together with an analog-to-digital converter (ADC) for converting the analog information into digital form. The user 18 interacts, typically by means of a graphical user interface (GUI) computer program with the NMS node, device or apparatus 12, for issuing commands as to how the NMS node 12 is to interact with the various managed devices.

The network of FIG. 1 uses Simple Network Management Protocol (SNMP) for managing the auxiliary or managed devices of set 16 of FIG. 1, and more particularly uses the most secure of the three versions of the SNMP protocol, which is SNMPv3. Simple Network Management Protocol (SNMP) v3 has an option for encrypting the user information flowing between or among the user GUI 18, the NMS 12, and the various managed devices of set 16. Encryption of the user information is termed "authentication" encryption or an authentication "password." Simple Network Management Protocol (SNMP) v3 also has an option for encrypting the SNMP message itself, which is referred to as a "privacy" encryption or password. Both the authentication and privacy passwords must be included in the SNMP message, and the passwords used by the NMS 12 and the user devices of set 16 must match in order for the message to be acted upon by the managed device.

FIG. 2 is a simplified functional block diagram of a prior-art network including a Network Management System (NMS) node device 12, and also including a managed device of set 16 of FIG. 1, taken for definiteness as being managed device 16b. Managed device 16b is also referred to as "Device 2." In FIG. 2, a request from the user's interface GUI is applied to a block 201a of NMS node 12, which regenerates the request in locally acceptable format. The local request is coupled from block 201a to a block 201b, which represents comparison of the credentials accompanying the request with locally stored versions for verification. The credentials are typically authorization and privacy passwords. In FIG. 2, internal request block 201a of NMS 12 receives from the user 18, by way of the GUI and a port 201ap, a request for information from Device 2. Block 201a generates an internal request. The internal request is applied to a block 201b to look up the current authentication and privacy passwords. The passwords found in block 201b are used in a block 201c to create an encrypted command. Then the encrypted command is sent out to a network, as represented by block 201d and a network path P. Device 2 receives the command at a block 202a by way of path P. Block 202b decrypts the encrypted command by the use of passwords previously stored in Device 2. The decrypted command is sent from block 202b to response generation block 202c. Block 202c gets local sensor information and generates a response. The response or status is then sent to the network, as represented by block 202d.

FIG. 3 is a simplified logic or control flow chart or diagram of the prior-art steps required in the prior-art network management system apparatus 10 of FIG. 1 in order to request information relating to a sensor. In FIG. 3, the user logs into NMS GUI, as indicated by block 203a. The user identifies the information that is desired, and then manually selects the new passwords to be used in authentication process, as suggested by block 203b. The user initiates a START command to command NMS 12 to send the newly selected passwords to all the remote managed devices of set 16, as suggested by block 203c. Block 203d represents the encoding of the new passwords using the old or previous passwords, and the sending of encoded new passwords to the various managed devices. Block 203e represents the receipt by the NMS node 12 of acknowledgement signals from the managed devices of set 16, encoded with the new passwords. The NMS node 12 polls for the requested information as in the prior art, as suggested by block 203f. If the user has additional requests, he returns to the first step, 203a, as suggested by the NO output of decision block 203i. If the requests have been completed, the user logs off the NMS system, as suggested by the YES output of decision block 203i and by block 203g. At some later time, the user has to go thru the same process again, as suggested by block 203h.

SUMMARY

A network running SNMPv3 includes conventional managed device(s) and a control provided with timed updating of the authentication and privacy password set. The control maintains memorized current password sets for each managed device, and also generates new passwords. In the automatic password updating mode of operation, a "change password" message including the new passwords is from time to time or periodically sent to the managed devices 16c encoded with the current passwords. If authenticated, the new passwords are adopted by the managed devices as current passwords, and an acknowledgement is sent to the control, encoded with the new passwords, from each managed device for which the password update is successful. The control responds by updating its stored current passwords to the new passwords for the managed device in question. When a user wants information from a particular one or ones of the managed devices, the control encodes the request message with the current passwords, and the managed device(s) responds with the information when the current passwords are verified.

A method according to an aspect of the disclosure is for accessing sensor information in a Simple Network Management Protocol v3 computer system with automating authentication of network devices. The method comprises the steps of providing at least one, and preferably a plurality of network managed devices, each of which network managed devices includes authentication and privacy password control and also includes at least one sensing device for sensing a physical state of the network managed device. A network management system is provided, the network management system including an autonomous authentication and privacy password generator which from time to time generates a new set of authentication and privacy passwords, and which maintains a record of the current authentication and privacy passwords for at least the network managed device. The method includes the step of sending a network management command from the network management system addressed to the network managed device(s), which network management command includes the new set of authentication and privacy commands, together with instructions to each of the addressed network managed device(s) to change the current set of authentication and privacy passwords of the network managed device to the new set of authentication and privacy passwords. The network management command is encoded with the current set of authentication and privacy passwords. The method also includes the step, at the network managed device, and in response to the network management command, if the set of authentication and privacy passwords with which the network management command is encoded corresponds to the current authentication and privacy passwords as known to the authentication and privacy password control, replacing (507) the current set of authentication and privacy passwords with the new set of authentication and privacy passwords, and generating and sending to the network management system an acknowledgement message encoded with the new set of authentication and privacy passwords. At the network management system, if the authentication and privacy passwords of the acknowledgement message correspond with the new authentication and privacy passwords known to the network management system, and in response to the acknowledgement message, updating the current set of authentication and privacy passwords known to the network management system to the new set of authentication and privacy passwords. At the network management system, in response to user commands, generating an information command requesting particular sensor information from the network managed device. The information command requesting particular sensor information from the network management system is transmitted to the network managed device encoded with the current authentication and privacy passwords. At the network managed device, and in response to the information command requesting particular sensor information, authenticating the authentication and privacy passwords in the command requesting particular sensor information, and in response to authentication of the information command requesting particular sensor information from the network managed device, generating and sending a response message to the network management system including the particular information and encoded with the current authentication and privacy passwords as stored in the network managed device. At the network management system, receiving the response message including the particular information encoded by the authentication and privacy passwords, and in response to the receipt of the response message, authenticating the authentication and privacy passwords in the response message by comparison with the current authentication and privacy passwords known to the network management system, and, in response to the authentication, accepting the particular information, and making the particular information available to the user.

A network management system according to an aspect of the disclosure includes a network management node and at least one network managed device. The network management system runs Simple Network Management Protocol (SNMP) v3. The node comprises a timer for establishing times for automatic password updates. The node also comprises a password generator for, in response to a command from the timer, generating new authorization and privacy codes. The node also includes a memory in which current authorization and privacy codes are stored for each network managed device. The node also comprises a processor for, in response to the timer, generating a message to at least one network managed device, the message including new authorization and privacy codes generated by the password generator, and all encoded by the current authorization and privacy codes. A node transmitter transmits the message on the network. A receiving device of the node is coupled to the network for receiving acknowledgement messages from the network, encrypted by the new authorization and privacy passwords. A decryptor is coupled to the receiving device for decrypting the acknowledgement messages using the new authorization and privacy passwords. A memory control arrangement is for, in response to decryption of the acknowledgement messages using the new authorization and privacy passwords, substituting the new authorization and privacy passwords for the current authorization and privacy passwords in the memory.

A network management system according to an aspect of the disclosure includes a network management node and at least one network managed device. The network management system runs a Network Management Protocol. The node comprises a memory in which current authorization and privacy codes are stored, a transmitter for transmitting a message on the network instructing the network managed device to accept new authorization and privacy codes, and a receiving device coupled to the network for receiving acknowledgement messages from the network managed device, encrypted by the new authorization and privacy passwords. The node may further comprise a memory control arrangement for, in response to decryption of the acknowledgement messages using the new authorization and privacy passwords, substituting the new authorization and privacy passwords for the current authorization and privacy passwords in the memory. The node may also comprise a decryptor coupled to the receiving device for decrypting the acknowledgement messages using the new authorization and privacy passwords. A timer may be used for establishing times for password updates. A password generator may be used for, in response to a command from the timer, generating the new authorization and privacy codes. The node may include a processor for, in response to the timer, generating the message to at least one network managed device instructing the network managed device to accept new authorization and privacy codes generated by the password generator, and all encoded by the current authorization and privacy codes.

DETAILED DESCRIPTION

Figure 1:
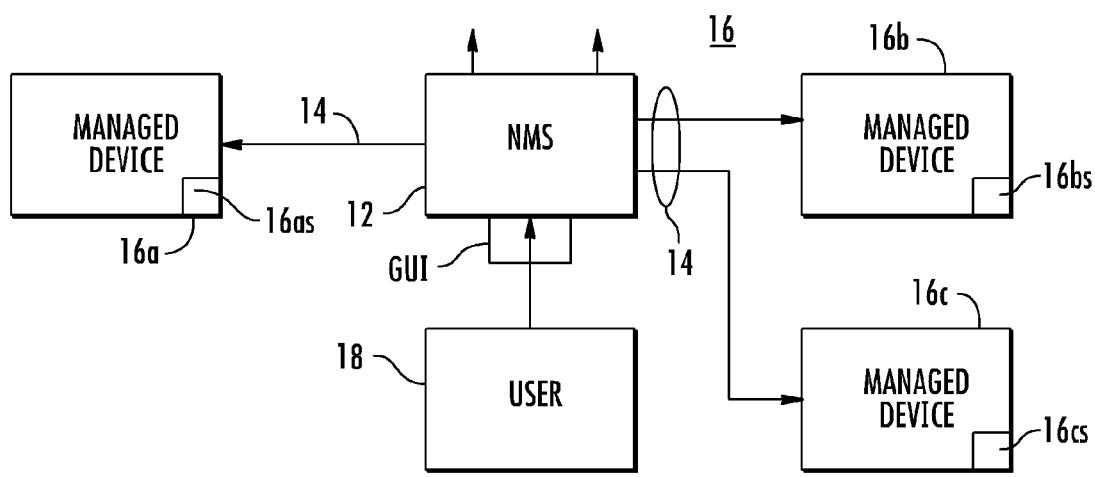
FIG. 1 is a simplified block diagram of a prior-art SNMPv3 network including a Network Management System (NMS) device and a plurality of managed devices.

The message and the user information in the network 10 of FIG. 1 are encrypted, so the system 10 is secure against snooping from a network cable. In this context, "snooping" means that a rogue user (a user who disrupts normal network or system operation, as a hacker) can run a software capable of intercepting and reading every message on a network. However, a rogue user who knows the authentication information can execute an "SNMPset" command with a particular Object Identification (OID) value from a node of the system. This command has the effect of directing the device to change its state and can, for example, result in shutdown of a switch or port. This can be accomplished notwithstanding that the rogue user is not running on NMS node 12 or even from the same NMS node, but from a different account on the same node or a different node. The network equipment and the network itself can be compromised in this manner.

According to an aspect of the disclosure, the possibility of attack by a rogue user who has access to the authentication password is reduced by frequent updates of the authentication and privacy passwords. This is accomplished by an autonomous password-generating aspect of the NMS node, together with an arrangement for commanding substitution of the new passwords for the old passwords in the various managed devices of set 16, including the user device 18. The passwords need only be set once manually, and the autonomous updating keeps the system secure thereafter, so that knowledge of the authentication password at a given time will not provide access at a later time.

Figure 4:
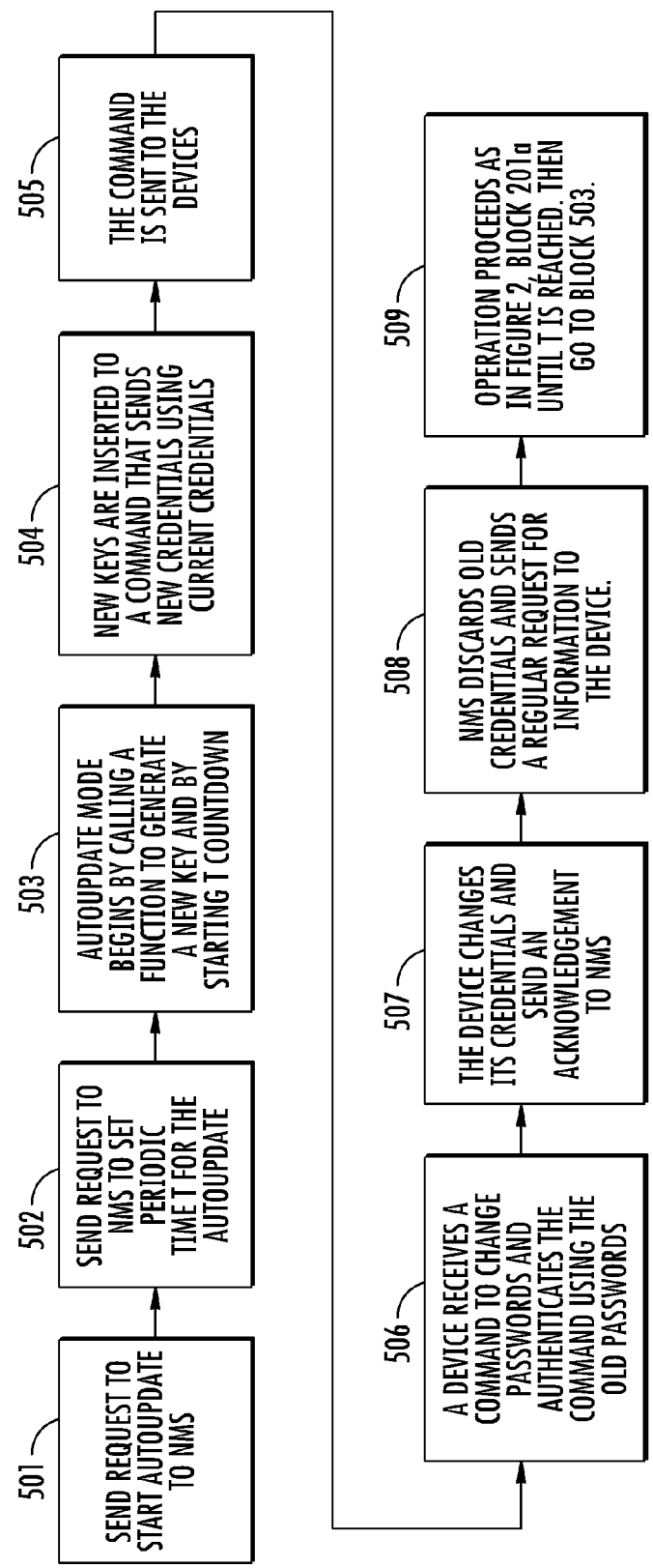
FIG. 4 is a simplified functional block diagram generally, showing autonomous generation of passwords and the commanding of updates of the passwords of managed devices and user devices.

FIG. 4 is a simplified functional block diagram of an NMS node according to an aspect of the disclosure. In FIG. 4, a block 501 represents a coupler for the coupling of a request from the user 18 GUI to the NMS node 12 to start the autoupdate function with a selected time interval T. Block 502 represents the sending of the request to the NMS node 12 to set the autoupdate time interval to T. From block 502, the instruction is applied to a block 503, in which a T-interval counter is started, and the autoupdate function is begun by calling for creation of new keys or credentials. Creation of keys is well known to those skilled in the art, and requires only a random-number generator and some ancillary functions. Block 504 represents the generation of a command carrying new credentials encoded with the current credentials. Block 505 represents the transmission of the command over the network to the various managed devices.

Figure 2:
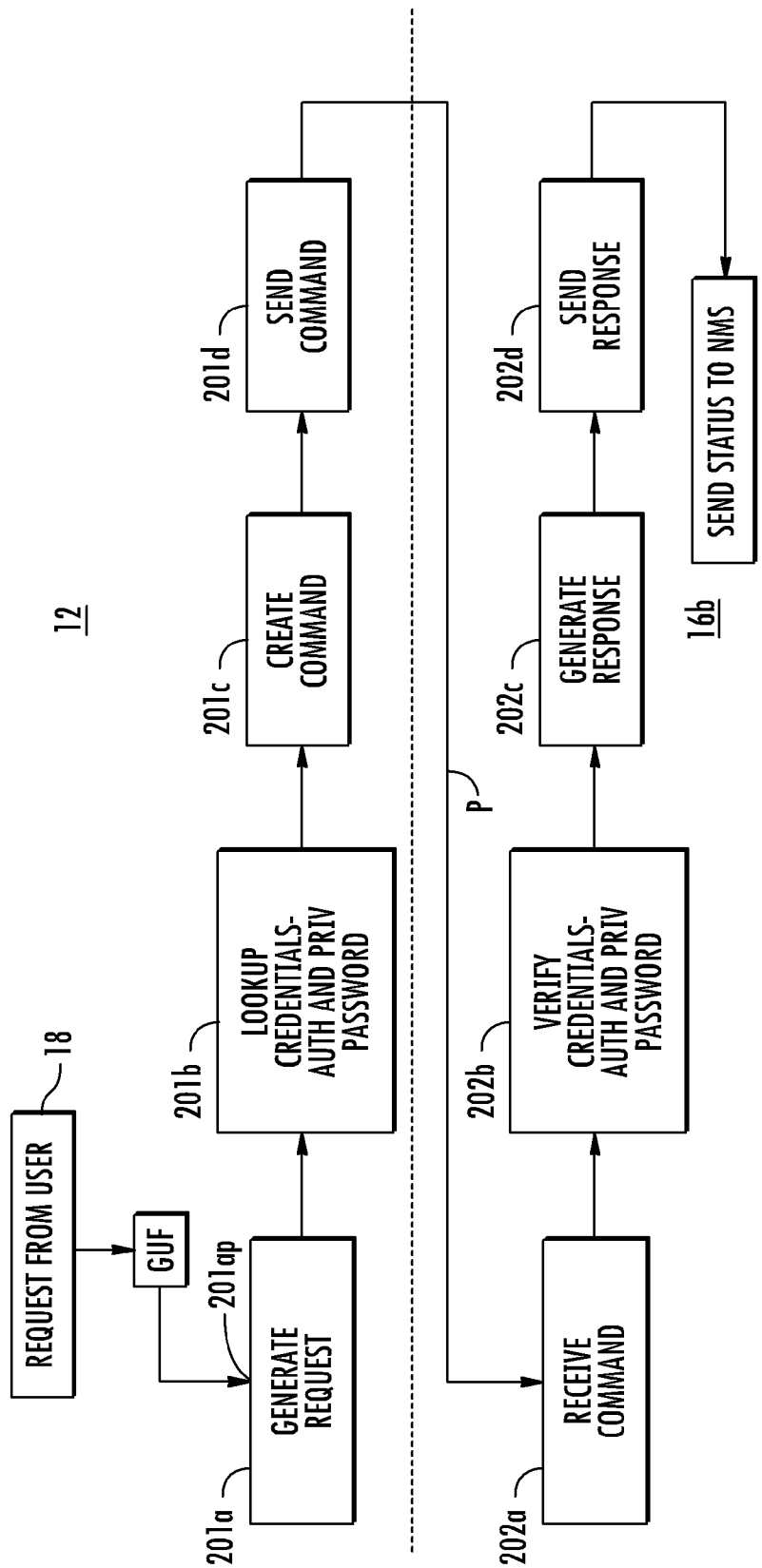
FIG. 2 is a simplified functional block diagram illustrating some details of a prior-art network including a managed device and a Network Management System node of the network of FIG. 1.
Figure 3:
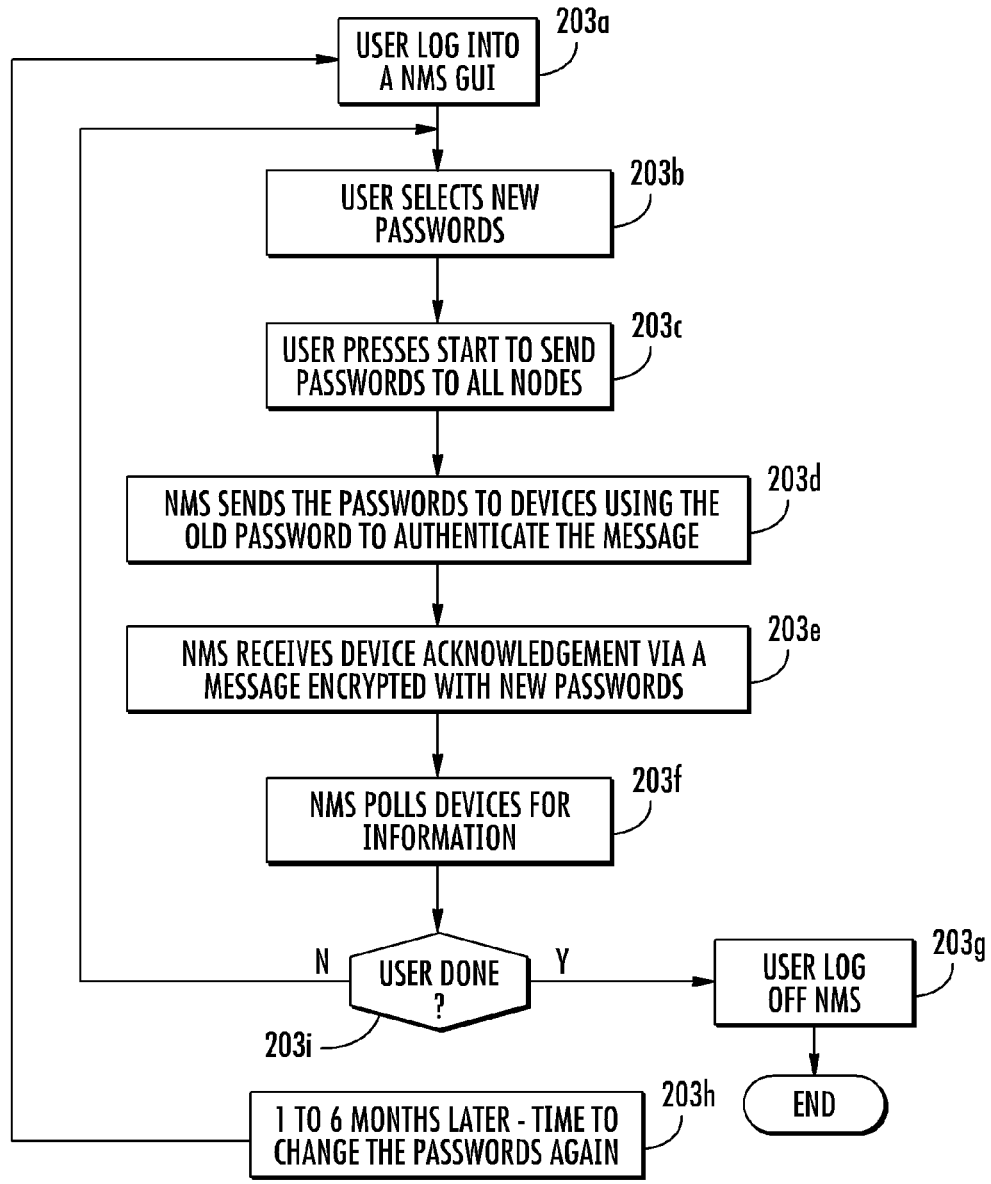
FIG. 3 is a simplified logic flow chart or diagram illustrating possible steps in the operation of the prior-art NMS of the network of FIGS. 1 and 2.

Block 506 of FIG. 4 represents the reception by one of the managed devices of the encoded command to change the credentials or passwords, and the decryption using the old credentials. Of course, if the old credentials fail, no further action is taken. Block 507 represents implementation of the change of credentials by discarding the old credentials and saving of the new. Thus, the functions of the managed device are unchanged. Block 508 represents the discarding of the old credentials at the NMS node 12 in response to the receipt of acknowledgements from all of the managed devices. The operation thereafter is similar to that of FIG. 2, as represented by block 509, until the expiry of time T. At time T, the function begins again at block 503.

Figure 5:
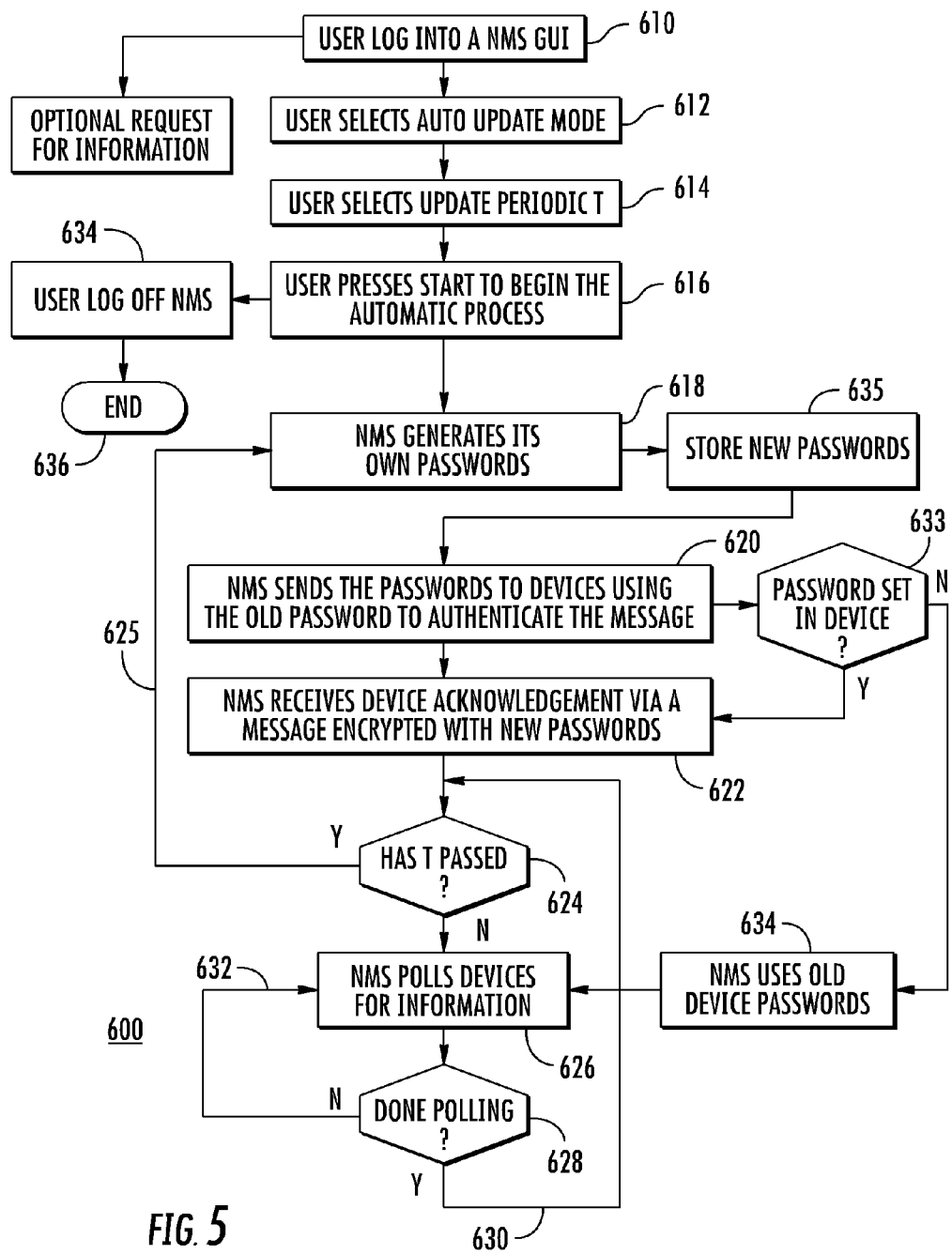
FIG. 5 is a simplified logic flow diagram or chart illustrating a sequence of operations which autonomously updates the various passwords in a system including an NMS device and user devices, and which, on command, provides sensor information to the user.

FIG. 5 is a simplified logic or control flow chart or diagram 600 illustrating operation of a Network Managed System using Simple Network Management Protocol version 3 (SNMPv3). In FIG. 5, the logic begins when a new user 18 logs into a NMS GUI, or a message is received from the network, as suggested by block 610. The logic flows from block 610 to a block 611, which represents the option to make a request for information. From block 611, the logic 600 flows to a block 612, which represents selection by the user of the automatic update mode, corresponding to block 501 of FIG. 4. From block 612 of FIG. 5, logic 600 flows to a further block 614, in which the user selects an update period or interval T. This corresponds to the inputting of a time T into block 502 of FIG. 4. From block 614, the logic 600 flows to a block 616, representing invoking of the automatic password generation portion of the operation of FIG. 5. Once the automatic function is selected, the user can log off the network, as suggested by block 634, whereupon this branch of the logic ends at a block 636. Regardless of whether the user logs off, the logic 600 of FIG. 5 flows from block 616 to a block 618. In block 618, the arrangement of FIG. 5 generates its own passwords, as described in conjunction with block 503 of FIG. 5. Block 618 also includes a decryptor. From block 618, logic 600 of FIG. 5 flows to a block 620, which represents the sending of the new passwords from the NMS node 12 to the managed devices of set 16, encrypted by the old passwords. From block 620, the logic 600 flows to a block 633, which represents the step of accepting the new password in the managed device and the generation of an acknowledgement message. Block 622 represents the step of receiving, at the NMS node 12, of the acknowledgements from the managed device(s) via a message from each, encrypted with the new passwords, and the changing of the old password in the NMS node to the newly acknowledged password for this particular managed device. If the managed device does not successfully update the old password to the new password, corresponding to leaving decision block 633 by the N output, the logic flows to a block 634, representing the continued use of the old password for this particular managed device. Assuming that the updates of the passwords take place in the ordinary course of operation, the logic flows from block 622 to a decision block 624, which represents determination of whether the time T has passed. If the time T has expired, the logic leaves decision block 624 by the YES (Y) output, and returns to block 618 by way of a logic path 625, for a new password generation and transmission cycle. If the time T has not expired, the logic 600 leaves decision block 624 by the NO (N) output, and flows to blocks 626 and 628 for polling of the managed devices for information pursuant to the request (if any). Decision block 628 determines whether the polling of the managed devices is complete. If not, the logic leaves decision block 628 by the N output, and returns by way of logic path 632 to block 626 to continue the polling. If the polling is determined by decision block 628 to be complete, the logic leaves decision block 628 by the Y output, and flows by way of a path 630 back to decision block 624 to track the time.

Figure 6:
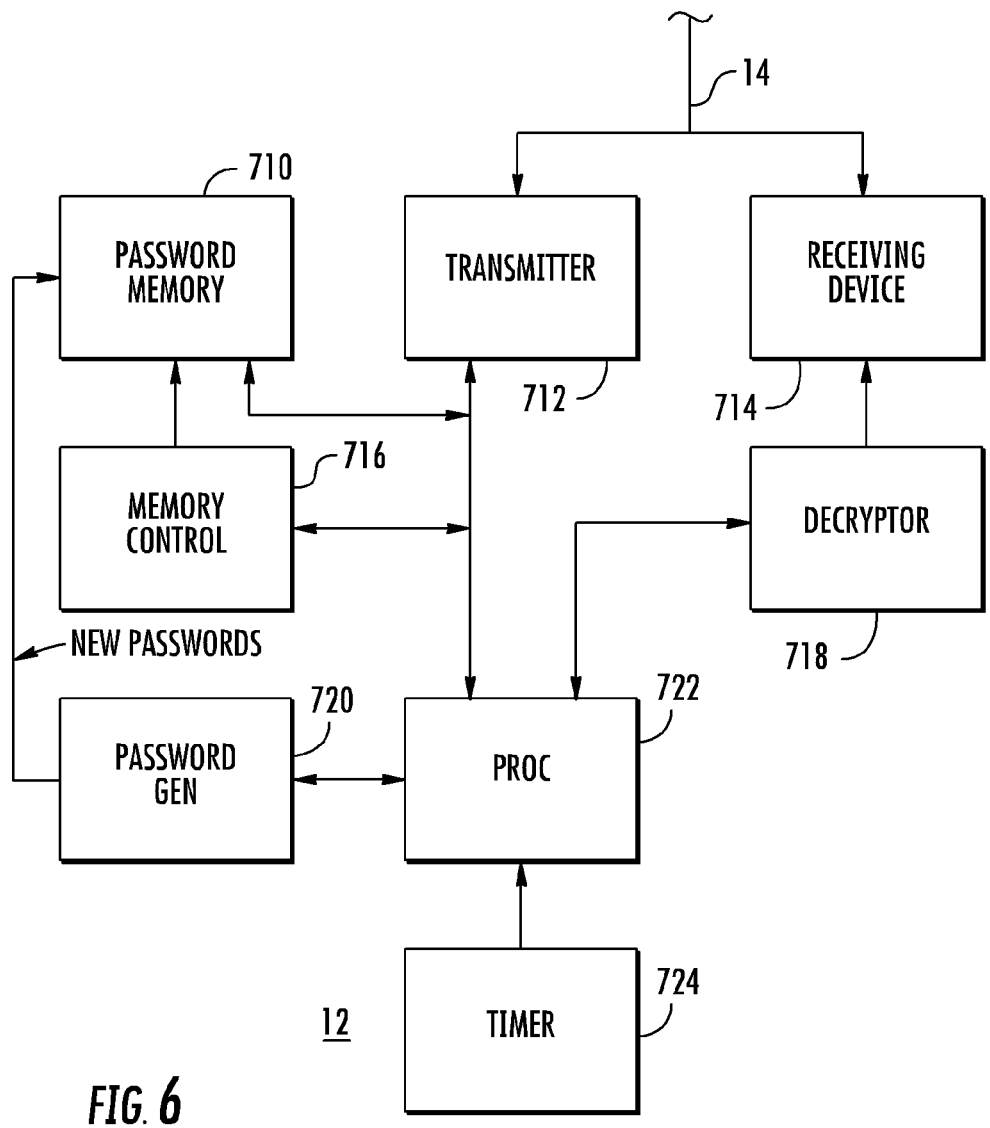
FIG. 6 is a simplified block diagram illustrating details of the NMS node of FIG. 1.

FIG. 6 illustrates some details of the organization of node 12 of FIG. 1. The network management system 12 runs a Network Management Protocol. The node 12 comprises a memory 710 in which current authorization and privacy codes are stored, a transmitter 712 for transmitting a message on the network (10 of FIG. 1) instructing the network managed device (16) to accept new authorization and privacy codes. The node 12 of FIG. 6 also includes a receiving device 714 coupled to the network 10 for receiving acknowledgement messages from the network managed device 16, encrypted by the new authorization and privacy passwords. The node may further comprise a memory control arrangement 716 for, in response to decryption of the acknowledgement messages using the new authorization and privacy passwords, substituting the new authorization and privacy passwords for the current authorization and privacy passwords in the memory 710. The node 12 may also comprise a decryptor 718 coupled to the receiving device 714 for decrypting the acknowledgement messages using the new authorization and privacy passwords. A timer 724 may be used for establishing times for password updates. A password generator 720 may be used for, in response to a command from the timer, generating the new authorization and privacy codes. The node may include a processor 722 for, in response to the timer 724, generating the message to at least one network managed device 16 instructing the network managed device 16 to accept new authorization and privacy codes generated by the password generator 720, and all encoded by the current authorization and privacy codes.

Thus, a network (10) running SNMPv3 includes conventional managed device(s) (16*a*, 16*b*, . . . , 16*c*) and a control (NMS 12) provided with timed updating of the authentication and privacy password set. The control maintains memorized current password sets for each managed device, and also generates new passwords. In the automatic password updating mode of operation, a "change password" message including the new passwords is from time to time or periodically sent to the managed devices (16*a*, 16*b*, . . . ), 16*c* encoded with the current passwords. If authenticated, the new passwords are adopted by the managed devices (16) as current passwords, and an acknowledgement is sent to the control (12), encoded with the new passwords, from each managed device for which the password update is successful. The control (12) responds by updating its stored current passwords to the new passwords for the managed device in question. When a user wants information from a particular one or ones of the managed devices, the control encodes the request message with the current passwords, and the managed device(s) responds with the information when the current passwords are verified.

A method according to an aspect of the disclosure is for accessing sensor information in a Simple Network Management Protocol v3 computer system (10) with automating authentication of network devices. The method comprises the steps of providing at least one, and preferably a plurality of network managed devices (16*a*, 16*b*, . . . , 16*c*), each of which network managed devices (16*a*, 16*b*, . . . , 16*c*) includes authentication and privacy password control and also includes at least one sensing device (16 as, 16*bs*, . . . , 16*cs*) for sensing a physical state of the network managed device (16*a*, 16*b*, . . . , 16*c*). A network management system (12) is provided, the network management system (12) including an autonomous authentication and privacy password generator (502, 503) which from time to time generates a new set of authentication and privacy passwords, and which maintains a record of the current authentication and privacy passwords for at least the network managed device (16*a*, 16*b*, . . . , 16*c*). The method includes the step of sending a network management command (505) from the network management system (12) addressed to the network managed device(s) (16*a*, 16*b*, . . . , 16*c*), which network management command includes the new set of authentication and privacy commands, together with instructions to each of the addressed network managed device(s) (16*a*, 16*b*, . . . , 16*c*) to change the current set of authentication and privacy passwords of the network managed device (16*a*, 16*b*, . . . , 16*c*) to the new set of authentication and privacy passwords. The network management command is encoded with the current set of authentication and privacy passwords. The method also includes the step, at the network managed device (16*a*, 16*b*, . . . , 16*c*), and in response to the network management command, if the set of authentication and privacy passwords with which the network management command is encoded corresponds to the current authentication and privacy passwords as known to the authentication and privacy password control, replacing (507) the current set of authentication and privacy passwords with the new set of authentication and privacy passwords, and generating and sending to the network management system (12) an acknowledgement message encoded with the new set of authentication and privacy passwords. At the network management system (12), if the authentication and privacy passwords of the acknowledgement message correspond with the new authentication and privacy passwords known to the network management system (12), and in response to the acknowledgement message, updating the current set of authentication and privacy passwords known to the network management system (12) to the new set of authentication and privacy passwords. At the network management system (12), in response to user commands (12GUI), generating an information command (201*c*, 203*f*; 611) requesting particular sensor information from the network managed device (16*a*, 16*b*, . . . , 16*c*). The information command requesting particular sensor information from the network management system (12) is transmitted (203*f*) to the network managed device (16*a*, 16*b*, . . . , 16*c*) encoded with the current authentication and privacy passwords. At the network managed device (16*a*, 16*b*, . . . , 16*c*), and in response to the information command requesting particular sensor information, authenticating the authentication and privacy passwords in the command requesting particular sensor information, and in response to authentication of the information command requesting particular sensor information from the network managed device (16*a*, 16*b*, . . . , 16*c*), generating and sending (202*c*) a response message to the network management system (12) including the particular information and encoded with the current authentication and privacy passwords as stored in the network managed device (16*a*, 16*b*, . . . , 16*c*). At the network management system (12), receiving (202*c*) the response message including the particular information encoded by the authentication and privacy passwords, and in response to the receipt of the response message, authenticating (201*b*) the authentication and privacy passwords in the response message by comparison with the current authentication and privacy passwords known to the network management system (12), and, in response to the authentication, accepting the particular information, and making the particular information available to the user (18).

A network management system (10) according to an aspect of the disclosure includes a network management node (12) and at least one network managed device (16). The network management system (10) runs Simple Network Management Protocol (SNMP) v3. The node (12) comprises a timer (502, 614) for establishing times for automatic password updates. The node (12) also comprises a password generator (503, 618) for, in response to a command from the timer (614), generating new authorization and privacy codes. The node (12) also includes a memory (201*b*) in which current authorization and privacy codes are stored for each network managed device (16). The node (12) also comprises a processor (612, 616, 618) for, in response to the timer (614), generating a message to at least one network managed device, (16), the message including new authorization and privacy codes generated by the password generator (503), and all encoded by the current authorization and privacy codes. A node (12) transmitter (203*d*) transmits the message on the network (10). A receiving device (610) of the node (12) is coupled to the network (10) for receiving acknowledgement messages from the network (10), encrypted by the new authorization and privacy passwords. A decryptor (618) is coupled to the receiving device (610) for decrypting the acknowledgement messages using the new authorization and privacy passwords. A memory control arrangement (635) is for, in response to decryption of the acknowledgement messages using the new authorization and privacy passwords, substituting the new authorization and privacy passwords for the current authorization and privacy passwords in the memory (635).

A network (10) management system according to an aspect of the disclosure includes a network management node (12) and at least one network managed device (16). The network management system runs a Network Management Protocol. The node (12) comprises a memory (610) in which current authorization and privacy codes are stored, a transmitter (712)

for transmitting a message on the network (10) instructing the network managed device (16) to accept new authorization and privacy codes, and a receiving device (714) coupled to the network (10) for receiving acknowledgement messages from the network managed device (16), encrypted by the new authorization and privacy passwords. The node may further comprise a memory control arrangement (716) for, in response to decryption of the acknowledgement messages using the new authorization and privacy passwords, substituting the new authorization and privacy passwords for the current authorization and privacy passwords in the memory (710). The node may also comprise a decryptor (718) coupled to the receiving device (714) for decrypting the acknowledgement messages using the new authorization and privacy passwords. A timer (724) may be used for establishing times for password updates. A password generator (720) may be used for, in response to a command from the timer (724), generating the new authorization and privacy codes. The node (12) may include a processor (722) for, in response to the timer (724), generating the message to at least one network managed device (16) instructing the network managed device (16) to accept new authorization and privacy codes generated by the password generator (720), and all encoded by the current authorization and privacy codes.

What is claimed is:

1. A method for accessing sensor information in a Network Management Protocol computer system with automating authentication of network devices, said method comprising the steps of:
   sending a network management command from a network management system to a network managed device, said network management command including a new set of authentication and privacy passwords, together with instructions to said network managed device to change a current set of authentication and privacy passwords of said network managed device to said new set of authentication and privacy passwords, said network management command encoded with said current set of authentication and privacy passwords;
   at said network managed device in response to said network management command, replacing said current set of authentication and privacy passwords with said new set of authentication and privacy passwords if said current set of authentication and privacy passwords corresponds to said current authentication and privacy passwords known to an authentication and privacy password control of said network managed device, and generating and sending to said network management system an acknowledgement message encoded with said new set of authentication and privacy passwords,
   wherein at said network managed device, and in response to an information command requesting particular sensor information, further comprising the step of authenticating said authentication and privacy passwords in said command requesting particular sensor information, and
   wherein in response to authentication of said information command requesting particular sensor information from said network managed device, further comprising the step of generating and sending a response message to said network management system.

2. The method of claim 1, wherein at said network management system, in response to said acknowledgement message, further comprising the step of updating the current set of authentication and privacy passwords to said new set of authentication and privacy passwords.

3. The method of claim 1, wherein at said network management system, in response to user commands, further comprising the step of generating an information command requesting particular sensor information from said network managed device.

4. The method of claim 3, further comprising the step of transmitting said information command requesting particular sensor information from said network management system to said network managed device encoded with said current authentication and privacy passwords.

5. The method of claim 1, wherein at said network management system, further comprising the step of receiving a response message including particular information encoded by said authentication and privacy passwords.

6. The method of claim 5, wherein in response to said receipt of said response message, authenticating said authentication and privacy passwords in said response message by comparison with current authentication and privacy passwords for at least said network management device stored in said network management system, and, in response to said authentication, accepting said particular information, and making said particular information available to a user.

7. The method of claim 1, wherein said Network Management Protocol computer system comprises a Simple Network Management Protocol v3 computer system.

8. A network management system including a network management node and at least one network managed device, said network management system running a Network Management Protocol, said node comprising:
   a memory in which current authorization and privacy passwords are stored;
   a transmitter for transmitting a message on said network instructing said network managed device to accept new authorization and privacy passwords generated by the network management system, the transmitter further configured to transmit an information command requesting particular sensor information from said managed network device and requesting authentication of said authorization and privacy passwords in said command requesting particular sensor information; and
   a receiving device coupled to said network for receiving acknowledgement messages from said network managed device, encrypted by said new authorization and privacy passwords and configured to receive a response message to said information command requesting particular sensor information from said network managed device.

9. The system of claim 8, further comprising a memory control arrangement for, in response to decryption of said acknowledgement messages using said new authorization and privacy passwords, substituting said new authorization and privacy passwords for said current authorization and privacy passwords in said memory.

10. The system of claim 9, further comprising a decryptor coupled to said receiving device for decrypting said acknowledgement messages using said new authorization and privacy passwords.

11. The system of claim 8, further comprising a timer for establishing times for password updates.

12. The system of claim 11, further comprising a password generator for, in response to a command from said timer, generating said new authorization and privacy passwords.

13. A network management system including a network management node and at least one network managed device, said network management system running a Network Management Protocol, said node comprising:
   a memory in which current authorization and privacy passwords are stored;

a transmitter for transmitting a message on said network instructing said network managed device to accept new authorization and privacy passwords, the transmitter further configured to transmit an information command requesting particular sensor information from said network managed device and requesting authentication of said authorization and privacy passwords in said command requesting particular sensor information;

a receiving device coupled to said network for receiving acknowledgement messages from said network managed device, encrypted by said new authorization and privacy passwords, and configured to receive a response message to said information command requesting particular sensor information from said network managed device;

a timer for establishing times for password updates;

a password generator for, in response to a command from said timer, generating said new authorization and privacy codes, and a processor for, in response to said timer, generating said message to at least one network managed device instructing said network managed device to accept new authorization and privacy passwords generated by said password generator, and all encoded by said current authorization and privacy passwords.

14. A network management system including a network management node and at least one network managed device, said network management system running a Network Management Protocol, said node comprising:

a timer for establishing times for password updates;

a password generator for, in response to a command from said timer, generating authorization and privacy passwords;

a memory in which current authorization and privacy passwords are stored;

a processor for, in response to said timer, generating a message to at least one network managed device, said message including new authorization and privacy passwords generated by said password generator, and all encoded by said current authorization and privacy passwords, the processor further configured to transmit an information command requesting particular sensor information from said network managed device and requesting authentication of said authorization and privacy passwords in said command requesting particular sensor information;

a transmitter for transmitting said message on said network;

a receiving device coupled to said network for receiving acknowledgement messages from said network, encrypted by said new authorization and privacy passwords, and configured to receive a response message to said information command requesting particular sensor information from said network managed device;

a decryptor coupled to said receiving device for decrypting said acknowledgement messages using said new authorization and privacy passwords;

a memory control arrangement for, in response to decryption of said acknowledgement messages using said new authorization and privacy passwords, substituting said new authorization and privacy passwords for said current authorization and privacy passwords in said memory.

15. The method of claim 1, wherein the new set of authentication and privacy passwords is generated automatically by the network management system.

16. The system of claim 8, wherein the new set of authentication and privacy passwords is generated automatically by the network management system.

* * * * *

UNITED STATES PATENT AND TRADEMARK OFFICE
CERTIFICATE OF CORRECTION

| | | |
|---|---|---|
| PATENT NO. | : 8,661,242 B1 | Page 1 of 1 |
| APPLICATION NO. | : 12/975600 | |
| DATED | : February 25, 2014 | |
| INVENTOR(S) | : Vladimir Gershman et al. | |

It is certified that error appears in the above-identified patent and that said Letters Patent is hereby corrected as shown below:

On the Title Page, Item (75), the second inventor's name, delete "John Bellizzi" and insert --Joseph Bellizzi--.

Signed and Sealed this
Sixth Day of May, 2014

Michelle K. Lee
*Deputy Director of the United States Patent and Trademark Office*